United States Patent Office 2,701,203
Patented Feb. 1, 1955

2,701,203

FOOD PRODUCTS CONTAINING ESTERS OF TRICARBOXYLIC ACIDS

Chester M. Gooding, Staten Island, N. Y., and Hans W. Vahlteich, Englewood, and Carl F. Brown, Jersey City, N. J., assignors to The Best Foods, Inc., New York, N. Y., a corporation of New Jersey No Drawing. Application October 21, 1950, Serial No. 191,498

39 Claims. (Cl. 99—163)

This invention relates to esters of aliphatic tricarboxylic acids and food products containing such esters.

An object of this invention is to improve markedly the shelf life of food products containing glyceridic oils, such as shortenings.

Another object of this invention is to maintain the flavor stability of a glyceridic oil in an emulsion and particularly under acidic conditions.

Another object of this invention is to increase the fluidity and to improve dispersion of components of culinary batters.

While compositions have been suggested for retarding the development of rancidity and flavor deterioration in food products containing glyceridic oils, such compositions migrate to the aqueous phase in emulsions containing glyceridic oils. Again, shortenings containing such compositions do not increase substantially the volume of high sugar cakes.

In accordance with this invention, compositions are provided which may be incorporated in the glyceridic oil of food products, which increase markedly the flavor stability of the glyceridic oil and which do not migrate to the aqueous phase when the glyceridic oil containing them is a component of an emulsion. The compositions also increase substantially the volume of high sugar cakes prepared from shortenings containing such compositions. These compositions are esters of aliphatic tricarboxylic acids in which the ester group has the following formula:

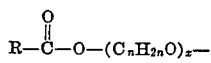

$$R-\overset{O}{\underset{\|}{C}}-O-(C_nH_{2n}O)_x-$$

in which R is an aliphatic hydrocarbon group having from 11 to 17 carbon atoms, n is a whole number greater than 1 and less than 5 and x is a whole number less than 5. The tricarboxylic acid has six carbon atoms and has no functional groups other than the carboxyl group and the hydroxyl group. Examples of the tricarboxylic acids are citric acid, aconitic acid, tricarballylic acid and isocitric acid.

To increase the flavor stability of a food product containing a glyceridic oil, at least 0.002%, desirably 0.002 to 2% and preferably 0.01 to 1%, of the ester of the aliphatic carboxylic acid is incorporated in the glyceridic oil. Throughout this description and claims, the percentage of ester is based on the glyceridic oil and the term "glyceridic oil" denotes any fat in liquid or solid form which may or may not be specifically processed to attain desirable properties, such as plasticity or melting point.

The esters of the tricarboxylic acid are produced by initially reacting the fatty acid having from 12 to 18 carbon atoms with either a glycol having the formula:

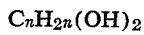

$$C_nH_{2n}(OH)_2$$

or with an alkylene oxide having the formula:

$$C_nH_{2n}O$$

in which n is a whole number greater than 1 and less than 5. It is desirable that more than one molecular equivalent of glycol or alkylene oxide be used so that the mono-acyl ester will be formed in predominant amounts since the di-acyl ester is incapable of reacting with the tricarboxylic acid and would therefore constitute an inert material. When a glycol is used as the reactant, the fatty acid and glycol are preferably reacted at a temperature at or approaching the boiling point of the glycol until the acid value is 5 or less, desirably with the distillation of water formed. If lower temperatures are used, when a glycol is the reactant, known esterification catalysts such as sulfuric acid may be used. When an alkylene oxide is the reactant, the reactants are placed in a closed pressure vessel and heated to about 150 to 175° C. The excess glycol or alkylene oxide remaining after completion of the reaction is removed by any suitable means, such as water washing or preferably by distillation when alkylene oxide is used as the reactant.

If it is desired to produce esters of polyglycols, an amount of alkylene oxide molecularly equivalent to the polymer desired is reacted with one molecular equivalent of the fatty acid. Desirably, the reaction is conducted in the presence of an ether catalyst, such as a tertiary amine, under such conditions as have heretofore been described for the preparation of the esters of the monoglycol when alkylene oxide is employed as the reactant. If desired, the polymeric glycol may be prepared separately before reaction with fatty acid, and in such case the polyglycol is reacted with the fatty acid under the same conditions heretofore described for the preparation of the mono-esters when a glycol is employed as the reactant.

The mono-acyl ester of the glycol or polyglycol is then reacted with the aliphatic tricarboxylic acid having six carbon atoms and no functional groups other than the carboxyl group and the hydroxyl group. For most purposes the molecular proportions of the reactants are such as to produce predominantly the mono-ester of the polycarboxylic acid. Preferably the reaction is conducted with agitation under reduced pressure, for example, at 50 mm. pressure of mercury or less, at a temperature of 125° to 170° C. until the maximum amount of polycarboxylic acid has been reacted as indicated by the cessation of bubbling. The excess of the polycarboxylic acid and any small amounts of polymer are removed by decantation or other suitable means.

The resulting ester of a polycarboxylic acid may be incorporated in a food product containing a glyceridic oil by dissolving the ester in the glyceridic oil. It may be dissolved in the oil at room temperature or lower or at elevated temperature depending upon the conditions or form of the glyceridic oil in the food product. The glyceridic oil may be in a substantially all oil system, such as shortening, or in an aqueous and oil system, such as margarine. Desirably in an aqueous and oil system, the ester of the polycarboxylic acid is dissolved in the oil component prior to the formation of the emulsion. Esters of the polycarboxylic acid have been found to possess the advantage that when used in systems containing two phases, one of which is an aqueous phase, the esters tend to remain in the oil phase after formation of the emulsion thereby affording continued protection to the oil. The esters of the polycarboxylic acid have also been found to have a marked smoothing and thinning action upon cake batters when incorporated in shortenings from which the cake batters are prepared. The presence of a few tenths of a percent, for example, even as little as 0.1% effects a marked reduction in viscosity of the batter with a smoothing effect upon the appearance of the batter. Use of higher quantities, such for example, as 1%, together with 3% of mono and diglycerides produces a high ratio cake of excellent volume and appearance. The actual volume in the case of a cake produced from a shortening containing 1% of mixed palmitoyl-stearoyl propylene glycol citrates (acid value 64.8 and saponification value 300.8), together with 3% of a mixture of about equal parts of mono and diglycerides of fatty acids having 16 and 18 carbon atoms gave a cake volume of 61.8 cubic inches, whereas a control containing only 3% of a mixture of the same monoand diglycerides had a volume of only 51.3 cubic inches. The esters of the polycarboxylic acid may also be used in enrobing mixtures, such as chocolate coating mixtures. When used in such mixtures at a level of 0.15%, the viscosity is decreased to less than one half of that of a control mixture as measured by the Mac-Michael viscometer.

A more comprehensive understanding of this invention is obtained by reference to the following typical examples:

Example 1.—Oleoyl propylene glycol citrates 560 parts of commercial oleic acid and 260 parts of propylene glycol are heated at 200° C. with 0.6 part of sodium bicarbonate until the acid value is less than 5. Excess glycol is removed by washing with water. The propylene glycol mono-oleate produced has a saponification value of 172.1 and after acetylation a saponification value of 264.3.

117 parts of propylene glycol mono-oleate prepared as described are reacted with 33 parts of citric acid by stirring under reduced pressure at 125–140° C. for 3 hours. A small amount of residue is removed by filtration. The oleoyl propylene glycol citrates have an acid value of 91.2 and a saponification value of 324. The citric acid content calculated from the saponification value is about 21.6%.

To 100 parts of winterized, unhydrogenated but deodorized sunflower oil is added 0.05 part of the oleoyl propylene glycol citrates. Desirably the mixture is heated to about 80° C. and agitated to effect the uniform distribution of the oleoyl propylene glycol citrates throughout the body of the oil. The addition of the oleoyl propylene glycol citrates to the oil increases markedly the flavor stability of the oil.

Example 2.—Oleoyl 1,3-butanediol citrates 560 parts of commercial oleic acid and 210 parts of 1,3-butanediol are heated together at 200° C. until the acid value falls below 5. Excess glycol is removed by washing with water. The product has a saponification value of 167.

112 parts of the foregoing ester are reacted with 33 parts of anhydrous citric acid according to the procedure described in Example 1. The resulting oleoyl 1,3-butanediol citrates have a saponification value of 321.6 and an acid value of 90.

To 100 parts of hydrogenated peanut oil maintained at a temperature of about 60° C. is added 0.5 part of oleoyl 1,3-butanediol citrates and 3 parts of a mixture of about equal parts of mono- and di-glycerides prepared from the fatty acids of peanut oil. The oil is agitated to effect the uniform distribution of the oleoyl 1,3-butanediol citrates and mono- and di-glycerides throughout the body of the oil. The resulting oil may be used as a shortening.

Example 3.—Stearoyl propylene glycol citrates 200 parts of commercial stearic acid, 51 parts of propylene oxide and 1.2 parts of sodium stearate are introduced into a pressure reactor. The contents of the vessel are heated to 150–165° C. and maintained within this range for 3 hours. After cooling, the reaction product is transferred to a vacuum vessel and any excess propylene oxide is stripped from the product by heating at 150° C. under reduced pressure in a stream of nitrogen for one half hour. The product has an acid value of 1.6, a saponification value of 173 and an hydroxyl content of 0.0024 mole per gram.

100 arts of the acyl propylene glycol are then heated to 165° C., at which temperature, 25 parts of anhydrous citric acid are added. Esterification is effected by heating at 160–170° C. for 1½ hours at 15 mm. mercury pressure while stirring and with introduction of an inert gas, such as nitrogen. The citric acid is thus reacted to yield a citrate ester having an acid value of 39.7 and a saponification value of 290.

To 100 parts of a margarine oil consisting of about 50% hydrogenated and deodorized cotton seed oil, 10% of hydrogenated and deodorized peanut oil and 40% of hydrogenated and deodorized soya bean oil is added 0.025 part of stearoyl propylene glycol citrates. The oil is maintained at a temperature of about 60° C., and after the addition of the esters, the oil is agitated to effect quick and uniform distribution of the ester throughout the body of the oil. The resulting oil may then be employed in the production of margarine by any conventional method.

Example 4.—Stearoyl propylene glycol citrates 100 parts of commerical stearic acid containing 1.2 parts of triamylamine are heated to 125° C. 25 parts of propylene oxide are added slowly (drop-wise) during a period of one hour while the temperature is maintained at 125–150° C. After this addition, the solution is heated for one hour at 150–175° C. Any excess propylene oxide and the catalyst, triamylamine, are removed by heating the product for one hour at 150–160° C. at 15 mm. pressure with a nitrogen stream for agitation. The product at this point has an acid value of 5.9 and a saponification value of 182. Esterification with citric acid is accomplished as described in Example 3.

The stearoyl propylene glycol citrates may be incorporated in any food product containing a glyceridic oil. For example, it may be incorporated in nut meat, such as peanuts, by incorporating 0.01% of the ester in the glyceridic oil in which the peanuts may be roasted.

Example 5.—Lauroyl tetrapropylene glycol citrates 100 parts of lauric acid, 128 parts of propylene oxide, and 2.3 parts of sodium stearate are introduced into a pressure reactor. The contents are heated at 150–160° C. for 3 hours. After cooling, the reaction product is transferred to a vacuum vessel and stripped of any excess propylene oxide. The product is found to have a saponification value of 127 and an acid value of 1.2.

100 parts of the resulting product are then reacted with 25 parts of anhydrous citric acid at 160–170° C. for 1½ hours at 60 mm. pressure. Any residue is removed by filtration. The lauroyl tetrapropylene glycol citrates thus obtained have a saponification value of 251 and an acid value of 71.2.

The lauroyl tetrapropylene glycol citrates may be incorporated in cheese, such as cream cheese, by adding the desired amount, such as 0.2% of the ester on the finished cheese, in the form of a water paste at the time of draining and before working in the conventional process for the production of cream cheese.

Example 6.—Palmitoyl tripropylene glycol citrates 100 parts of commercial palmitic acid are heated with 68 parts of tripropylene glycol at 200° C. until the acid value drops to less than 5. Excess tripropylene glycol is removed by salt-water washing.

100 parts of the resulting product are then esterified with 25 parts of anhydrous citric acid by heating at 160–170° C. for 2 hours under a pressure of 30 mm. Clarification is effected by filtration. The palmitoyl tripropylene glycol citrates thus formed have a saponification value of 257 and an acid value of 51.

The palmitoyl tripropylene glycol citrates or any other citrates described in any of the other examples may be incorporated in a glyceridic oil or in the glyceridic oil component of a food product as described in Examples 1 to 5. For instance, 0.01% of the palmitoyl tripropylene glycol citrates may be contained in the vegetable oil used for frying potato chips. The resulting potato chips have incorporated in them palmitoyl tripropylene glycol citrates. Or again, the palmitoyl tripropylene glycol citrates or other citrates described herein may be incorporated in enrobing mixtures. For example, an enrobing mixture may be produced with vegetable coating fat containing 0.15% of palmitoyl tripropylene glycol citrates. A typical enrobing composition might be 22.2% of the vegetable coating fat containing 0.15% of the citrates, 2.5% of skim milk powder, 2.5% of corn starch, 0.6% of gelatin, 2.0% of corn syrup, 55.5% of powdered 4X sugar, 0.2% of salt, 14.5% of water and the desired flavoring ingredients.

Other examples of food products in which the acyl glycol citrates may be incorporated are substantially dehydrated products, such as egg powders, milk powders and shredded cocoanut.

Example 7.—Palmitoyl propylene glycol tricarballylates 200 parts of palmitic acid and 57 parts of propylene glycol are heated together at 200° C. until the acid value reaches a value of 5 or less. Excess propylene glycol is then removed by water washing.

150 parts of this product are reacted with 44 parts of tricarballylic acid by heating at 160–170° C. for 3 hours at 50 mm. pressure. Any residue from the reaction is removed by filtration. The palmitoyl propylene glycol tricarballylates have a saponification value of 370 and an acid value of 80.6.

Example 8.—Oleoyl 1,3-butanediol aconitates 140 parts of oleic acid is reacted with 50 parts of butanediol-1.3 by heating at 150° C., using 1% concentrated sulfuric acid as catalyst, until the acid value is reduced to 5 or less. Water formed is allowed to distill from the reaction mixture. Excess glycol and catalyst are removed by water washing.

100 parts of the resulting ester are heated with 15 parts of aconitic acid at 165° C. under a pressure of 30 mm. until the acid value is less than 10. The product is found to have a saponification value of 302 and an acid value of 8.6.

*Example 9.—Mixed acyl propylene glycol citrates*

715 parts of completely hydrogenated cotton seed stearine are reacted with 230 parts of propylene glycol in the presence of 9½ parts of sodium stearate at a temperature between 190 to 220° C. for 3 hours. The product is given two successive water washes of 200 parts. The aqueous layers are separated for subsequent recovery of glycerine and propylene glycol. The washed ester is then treated with 10% by weight of citric acid as a clean-up wash and as a means of removing remaining glycerine and glycol in the form of a solution of citric acid, propylene glycol and glycerine. The propylene glycol mono-esters treated in this manner are clear, brilliant and light colored.

108 parts of the propylene glycol mono-esters prepared as heretofore described are then reacted with 21.6 parts of citric acid mono-hydrate for 1 hour at atmospheric pressure at 135° C., followed by 2 hours under reduced pressure at a temperature of 140–145° C. The product has an acid value of 66.9, a saponification value of 287.9 and has a citric acid content of 16%.

The terms and expressions which we have employed are used as terms of description and not of limitation, and we have no intention in the use of such terms and expressions, of excluding any equivalents of the features shown and described or portions thereof, but recognize that various modifications are possible within the scope of the invention claimed.

What is claimed is:

1. A food product comprising a glyceridic oil having incorporated therein at least 0.002% of a mono-ester of an aliphatic tricarboxylic acid in which the aliphatic tricarboxylic acid is esterified with a radical having the following formula:

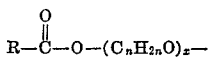

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group.

2. A food product comprising a glyceridic oil having incorporated therein at least 0.002% of a mono-ester of citric acid in which the citric acid is esterified with a radical having the following formula:

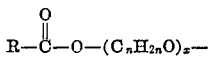

in which R is an aliphatic hydrocarbon group having from 11 to 17 carbon atoms, $n$ is a whole number greater than 1 and less than 5 and $x$ is a whole number less than 5.

3. A food product comprising a glyceridic oil having incorporated therein at least 0.002% of a mono-ester of aconitic acid in which the aconitic acid is esterified with a radical having the following formula:

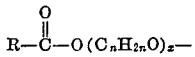

in which R is an aliphatic hydrocarbon group having from 11 to 17 carbon atoms, $n$ is a whole number greater than 1 and less than 5 and $x$ is a whole number less than 5.

4. A food product comprising a glyceridic oil having incorporated therein at least 0.002% of a mono-ester of tricarballylic acid in which the tricarballylic acid is esterified with a radical having the following formula:

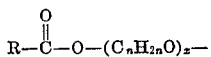

in which R is an aliphatic hydrocarbon group having from 11 to 17 carbon atoms, $n$ is a whole number greater than 1 and less than 5 and $x$ is a whole number less than 5.

5. A food product comprising a glyceridic oil having incorporated therein at least 0.002% of a mono-ester of citric acid in which the citric acid is esterified with a radical having the following formula:

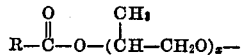

in which R is an aliphatic hydrocarbon group having from 11 to 17 carbon atoms and $x$ is a whole number less than 5.

6. A food product comprising a glyceridic oil having incorporated therein at least 0.002% of a mono-ester of tricarballylic acid in which the tricarballylic acid is esterified with a radical having the following formula:

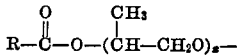

in which R is an aliphatic hydrocarbon group having from 11 to 17 carbon atoms and $x$ is a whole number less than 5.

7. A food product comprising a glyceridic oil having incorporated therein at least 0.002% of a mono-ester of aconitic acid in which the aconitic acid is esterified with a radical having the following formula:

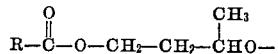

in which R is an aliphatic hydrocarbon group having from 11 to 17 carbon atoms.

8. A food product comprising a glyceridic oil having incorporated therein at least 0.002% of a mono-ester of an acid selected from the class consisting of alpha and beta hydroxy-substituted aliphatic tricarboxylic acids in which the aliphatic tricarboxylic acid is esterified with a radical having the following formula:

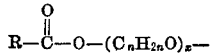

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group and the hydroxyl group.

9. A food product comprising a glyceridic oil having incorporated therein at least 0.002% of a mono-ester of citric acid in which the citric acid is esterified with a radical having the following formula:

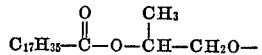

10. A food product comprising a glyceridic oil having incorporated therein at least 0.002% of a mono-ester of tricarballylic acid in which the tricarballylic acid is esterified with a radical having the following formula:

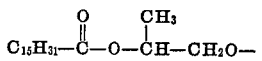

11. A food product comprising a glyceridic oil having incorporated therein at least 0.002% of a mono-ester of citric acid in which the citric acid is esterified with a radical having the following formula:

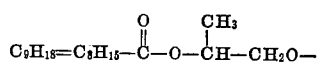

12. A food product comprising a glyceridic oil having incorporated therein at least 0.002% of a mono-ester of citric acid in which the citric acid is esterified with a radical having the following formula:

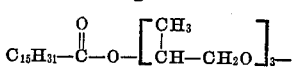

13. A food product comprising a glyceridic oil having incorporated therein at least 0.002% of a mono-ester of aconitic acid in which the aconitic acid is esterified with a radical having the following formula:

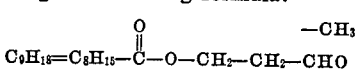

14. A food product comprising a glyceridic oil having incorporated therein from about 0.002% to 2% of a monoester of an aliphatic tricarboxylic acid in which the aliphatic tricarboxylic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group.

15. A food product comprising a glyceridic oil having incorporated therein from about 0.002% to 2% of a monoester of an acid selected from the class consisting of alpha and beta hydroxy-substituted aliphatic tricarboxylic acids in which the aliphatic tricarboxylic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group and the hydroxyl group.

16. A food product comprising a glyceridic oil having incorporated therein from about 0.002% to 2% of a monoester of citric acid in which the citric acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5.

17. A food product comprising a glyceridic oil having incorporated therein from about 0.002% to 2% of a monoester of aconitic acid in which the aconitic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5.

18. A food product comprising a glyceridic oil having incorporated therein from about 0.002% to 2% of a monoester of tricarballylic acid in which the tricarballylic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5.

19. A food product comprising a glyceridic oil having incorporated therein from about 0.002% to 2% of a monoester of citric acid in which the citric acid is esterified with a radical having the following formula:

$$R-\overset{O}{\underset{\|}{C}}-O-(\overset{CH_3}{\underset{|}{C}H}-CH_2O)_x-$$

in which R is an aliphatic hydrocarbon group having from 11 to 17 carbon atoms and $x$ is a whole number less than 5.

20. A food product comprising a glyceridic oil having incorporated therein from about 0.002% to 2% of a monoester of tricarballylic acid in which the tricarballylic acid is esterified with a radical having the following formula:

$$R-\overset{O}{\underset{\|}{C}}-O-(\overset{CH_3}{\underset{|}{C}H}-CH_2O)_x-$$

in which R is an aliphatic hydrocarbon group having from 11 to 17 carbon atoms and $x$ is a whole number less than 5.

21. A food product comprising a glyceridic oil having incorporated therein from about 0.002% to 2% of a monoester of aconitic acid in which the aconitic acid is esterified with a radical having the following formula:

$$R-\overset{O}{\underset{\|}{C}}-O-CH_2-CH_2-\overset{CH_3}{\underset{|}{C}H}O-$$

in which R is an aliphatic hydrocarbon group having from 11 to 17 carbon atoms.

22. A food product comprising a glyceridic oil having incorporated therein from about 0.002% to 2% of a monoester of citric acid in which the citric acid is esterified with a radical having the following formula:

$$C_{17}H_{35}-\overset{O}{\underset{\|}{C}}-O-\overset{CH_3}{\underset{|}{C}H}-CH_2O-$$

23. A food product comprising a glyceridic oil having incorporated therein from about 0.002% to 2% of a monoester of tricarballylic acid in which the tricarballylic acid is esterified with a radical having the following formula:

$$C_{15}H_{31}-\overset{O}{\underset{\|}{C}}-O-\overset{CH_3}{\underset{|}{C}H}-CH_2O-$$

24. A food product comprising a glyceridic oil having incorporated therein from about 0.002% to 2% of a monoester of citric acid in which the citric acid is esterified with a radical having the following formula:

$$C_9H_{18}=C_8H_{15}-\overset{O}{\underset{\|}{C}}-O-\overset{CH_3}{\underset{|}{C}H}-CH_2O-$$

25. A food product comprising a glyceridic oil having incorporated therein from about 0.002% to 2% of a monoester of citric acid in which the citric acid is esterified with a radical having the following formula:

$$C_{15}H_{31}-\overset{O}{\underset{\|}{C}}-O-\left[\overset{CH_3}{\underset{|}{C}H}-CH_2O\right]_3-$$

26. A food product comprising a glyceridic oil having incorporated therein from about 0.002% to 2% of a monoester of aconitic acid in which the aconitic acid is esterified with a radical having the following formula:

$$C_9H_{18}=C_8H_{15}-\overset{O}{\underset{\|}{C}}-O-CH_2-CH_2-\overset{CH_3}{\underset{|}{C}H}O-$$

27. A food product comprising a glyceridic oil having incorporated therein from about 0.01% to 1% of a monoester of an aliphatic tricarboxylic acid in which the aliphatic tricarboxylic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group.

28. A food product comprising a glyceridic oil having incorporated therein from about 0.01% to 1% of a monoester of an acid selected from the class consisting of alpha and beta hydroxy-substituted aliphatic tricarboxylic acids in which the aliphatic tricarboxylic acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5, said tricarboxylic acid having six carbon atoms and having no functional groups other than the carboxyl group and the hydroxyl group.

29. A food product comprising a glyceridic oil having incorporated therein from about 0.01% to 1% of a monoester of citric acid in which the citric acid is esterified with a radical having the following formula:

$$R-\overset{O}{\underset{\|}{C}}-O-(C_nH_{2n}O)_x-$$

in which R is an aliphatic hydrocarbon group having from 11 to 17 carbon atoms, $n$ is a whole number greater than 1 and less than 5 and $x$ is a whole number less than 5.

30. A food product comprising a glyceridic oil having incorporated therein from about 0.01% to 1% of a monoester of aconitic acid in which the aconitic acid is esterified with a radical having the following formula:

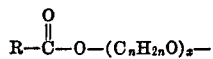

in which R is an aliphatic hydrocarbon group having from 11 to 17 carbon atoms, $n$ is a whole number greater than 1 and less than 5 and $x$ is a whole number less than 5.

31. A food product comprising a glyceridic oil having incorporated therein from about 0.01% to 1% of a monoester of tricarballylic acid in which the tricarballylic acid is esterified with a radical having the following formula:

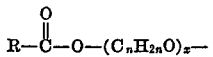

in which R is an aliphatic hydrocarbon group having from 11 to 17 carbon atoms, $n$ is a whole number greater than 1 and less than 5 and $x$ is a whole number less than 5.

32. A food product comprising a glyceridic oil having incorporated therein from about 0.01% to 1% of a monoester of citric acid in which the citric acid is esterified with a radical having the following formula:

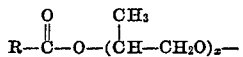

in which R is an aliphatic hydrocarbon group having from 11 to 17 carbon atoms and $x$ is a whole number less than 5.

33. A food product comprising a glyceridic oil having incorporated therein from about 0.01% to 1% of a monoester of tricarballylic acid in which the tricarballylic acid is esterified with a radical having the following formula:

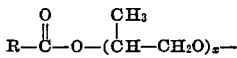

in which R is an aliphatic hydrocarbon group having from 11 to 17 carbon atoms and $x$ is a whole number less than 5.

34. A food product comprising a glyceridic oil having incorporated therein from about 0.01% to 1% of a monoester of aconitic acid in which the aconitic acid is esterified with a radical having the following formula:

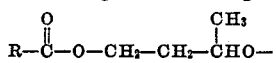

in which R is an aliphatic hydrocarbon group having from 11 to 17 carbon atoms.

35. A food product comprising a glyceridic oil having incorporated therein from about 0.01% to 1% of a monoester of citric acid in which the citric acid is esterified with a radical having the following formula:

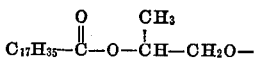

36. A food product comprising a glyceridic oil having incorporated therein from about 0.01% to 1% of a monoester of tricarballylic acid in which the tricarballylic acid is esterified with a radical having the following formula:

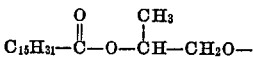

37. A food product comprising a glyceridic oil having incorporated therein from about 0.01% to 1% of a monoester of citric acid in which the citric acid is esterified with a radical having the following formula:

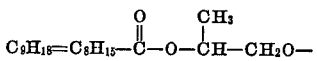

38. A food product comprising a glyceridic oil having incorporated therein from about 0.01% to 1% of a monoester of citric acid in which the citric acid is esterified with a radical having the following formula:

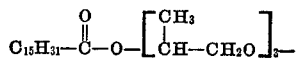

39. A food product comprising a glyceridic oil having incorporated therein from about 0.01% to 1% of a monoester of aconitic acid in which the aconitic acid is esterified with a radical having the following formula:

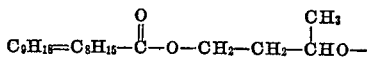

References Cited in the file of this patent

UNITED STATES PATENTS

| Number | Name | Date |
|---|---|---|
| 1,857,274 | Ermhardt | May 10, 1932 |
| 1,898,363 | Greenbank | Feb. 21, 1933 |
| 2,122,716 | Graves | July 5, 1938 |
| 2,266,591 | Eckey et al. | Dec. 16, 1941 |
| 2,329,394 | De Groote et al. | Sept. 14, 1943 |
| 2,464,202 | Rust | Mar. 15, 1949 |
| 2,485,632 | Vahlteich et al. | Oct. 25, 1949 |
| 2,485,640 | Vahlteich et al. | Oct. 25, 1949 |